United States Patent [19]
Moggi et al.

[11] Patent Number: 4,734,465
[45] Date of Patent: Mar. 29, 1988

[54] VULCANIZABLE COMPOSITIONS OF FLUOROELASTOMERS HAVING IMPROVED SELF-LUBRICATING PROPERTIES AND A FAST CURE RATE

[75] Inventors: Giovanni Moggi, Milan; Gianna Cirillo, Genova, both of Italy

[73] Assignee: Montedison S.p.A., Milan, Italy

[21] Appl. No.: 888,158

[22] Filed: Jul. 22, 1986

Related U.S. Application Data

[63] Continuation of Ser. No. 688,903, Jan. 4, 1985, abandoned.

[30] Foreign Application Priority Data

Jan. 6, 1984 [IT] Italy ............................... 19046 A/84

[51] Int. Cl.[4] ................................................ C08F 8/00
[52] U.S. Cl. .................................. 525/340; 525/326.3; 525/343; 525/348; 525/353
[58] Field of Search ..................... 525/326.3, 340, 343, 525/348, 353, 384

[56] References Cited

U.S. PATENT DOCUMENTS

| 3,884,877 | 5/1975 | Kolb | 525/340 |
| 4,250,278 | 2/1981 | Suzuki | 525/340 |
| 4,259,463 | 3/1981 | Moggi | 525/331 |
| 4,287,320 | 9/1981 | Kolb | 525/340 |

*Primary Examiner*—Christopher Henderson
*Attorney, Agent, or Firm*—Stevens, Davis, Miller & Mosher

[57] ABSTRACT

Vulcanizable fluoroelastomer compositions having as base a copolymer of vinylidene fluoride (from 40 to 84 mol %) with perfluoropropene (15 to 30 mol %) and with tetrafluoroethylene (0.30 mol %) and containing a vulcanizing agent of the polyhydroxy compound type, an accelerator of the aminophosphinic compound type, metal oxides and/or hydroxides of basic character and an alkyl, cycloalkyl or aryl compound from the group of phosphoric esters, aminophosphoric esters, sulfoxides and sulfones.

10 Claims, No Drawings

VULCANIZABLE COMPOSITIONS OF FLUOROELASTOMERS HAVING IMPROVED SELF-LUBRICATING PROPERTIES AND A FAST CURE RATE

This is a continuation of application Ser. No. 688,903, filed Jan. 4, 1985 and now abandoned.

BACKGROUND OF THE INVENTION

In the course of the development of fluorinated elastomers, very precise requirements have been emphasized recently, namely the simultaneous attainment of the following goals:

1. An overall improvement in the rheological properties and the processability of the mixtures.
2. A decrease in the hardness of the mixtures (as compared with the Shore A value of 75 reported in Kirk Othmer—Third Edition (1980), Volume 8, page 509, as typical value for a fluoroelastomer).
3. The possibility of easily extruding products of complicated profile and also of substantial dimensions.
4. The obtaining of vulcanized products having improved properties of resistance to deformation under compression (improvement of the compression set).
5. An easily controllable cure rate.

Different types of plasticizing agents are already used in the art in order to obtain goals 1 to 3, they, however, generally giving rise to various drawbacks such as a worsening of the elastic properties, poorer heat resistance, and high values of the compression set. Better results have been obtained with the fluoroelastomer compositions in accordance with the applicant's European Pat. No. 23957; in that case, however, optimum characteristics limited to items 1-3 are obtained.

THE PRESENT INVENTION

With the fluoroelastomeric compositions of the present invention each and all of the goals from 1 to 5 indicated above are obtained.

The vulcanizable fluoroelastomeric compositions of the present invention are formed of:

(a) 100 parts by weight of a copolymer having a base of vinylidene fluoride (40 to 84 mol% and preferably 50 to 80 mol%), of perfluoropropene (15 to 30 mol% and preferably 20 to 25 mol%), and possibly also tetrafluorethylene (0 to 30 mol% and preferably 0 to 20 mol%);

(b) from 0.3 to 6 parts by weight of one or more compounds of the general formula $R_nX$ in which n equals 2 or 3, X is a bivalent or trivalent group selected from phosphoric esters $$\begin{array}{c}-O\\-O-P=O,\\-O\end{array}$$

imino phosphoric esters $$\begin{array}{c}-O\\-O-P=NH,\\-O\end{array}$$

phosphine oxide

sulfoxide

and sulfone

and R is an alkyl, cycloakyl or aryl radical having from 1 to 18 carbon atoms, two R groups being possibly attached to each other to form an alkylene bivalent radical;

(c) from 0.3 to 6 parts by weight of a polyhydroxy compound of the type known as vulcanizing agent for fluoroelastomers;

(d) from 0.2 to 4 parts by weight of an aminophosphine or phosphoraneamine compound of the type known as accelerating agent in the vulcanization of fluoroelastomers with the polyhydroxy compounds (c) described in the applicant's U.S. Pat. No. 4,259,463;

(e) from 1 to 20 parts by weight of one or more acid acceptors formed of metal oxides, hydrates or carbonates having a basic character, of the type known in the vulcanization of fluoroelastomers.

As compounds of group (b) which are particularly suitable for use mention may be made of dimethyl sulfoxide, bis(p. chlorophenyl) sulfone, bis(p. chlorophenyl) sulfoxide, dimethyl sulfone, cyclic tetramethylene sulfoxide, triphenylphosphine oxide and trioctyl phosphate.

As examples of compounds of group (c) which are suitable for use, mention may be made of hydroquinone, resorcinol, 2,2-bis(p-hydroxyphenyl) hexafluoropropane or bisphenol AF, 2,2'-bis(p-hydroxyphenyl) propane or bisphenol A.

As compounds of group (d), mention may be made of 1-chloro-1,1-diphenyl-2-benzyl-N diethyl phorphoraneamine, 1-bromo-1-phenyl-1-benzyl-N,N'-tetramethyl-phorphoranediamine and N,N',N''-hexamethyl-N'''(o-tolyl)-phorphorimido-triamide.

The fluoroelastomeric compounds of the present invention can be vulcanized by the customary operating techniques, comprising a first phase of press vulcanization at 160° to 190° C. for periods of time of 1 to 60 minutes and preferably 2 to 20 minutes, and a subsequent phase of additional moldless vulcanization of the shaped product in an oven at 140°–290° C. and preferably 200°–270° C., for periods of time of 5 to 48 hours and preferably 8 to 24 hours.

A few examples are indicated below by way of illustration, but not of limitation, of the possibilities of the reduction to practice of the present invention.

In the examples given in Tables 1 and 2 the following products were used:

Fluoroelastomer 1 = copolymer $CH_2=CF_2/C_3F_6$ in a molar ratio of 4:1, having a density of 1.816 at 25° C., known as Tecnoflon NM (a trademark of Montedison S.p.A.).

Fluorelastomer 2 = terpolymer $CH_2=CF_2/C_3F_6/C_2F_4$ in a molar ratio of 3:1:1, density 1.860 at 25° C., Mooney viscosity ML (1+4) = 120° to 100° C.

Accelerator = 1-chloro-1,1-diphenyl-1-benzyl-N-diethyl-phorphoraneamine.

The results of the tests set forth in Table 1 show that the compounds of the invention lead to an increase in a specific parameter of the speed of vulcanization such as the "cure rate" as compared with Example 1. At the same time, there is noted an improvement in the compression set and of the extrudability test as compared with Example 1. From the results of Table 2 which relates to a terpolymer, a similar improvement is noted in the compression set and in the extrudability, in addition to an improvement in the cure rate.

TABLE 1

|  | EXAMPLE | | | | | | |
| --- | --- | --- | --- | --- | --- | --- | --- |
|  | 1 | 2 | 3 | 4 | 5 | 6 | 7 |
| Elastomer 1 parts per weight | 100 | 100 | 100 | 100 | 100 | 100 | 100 |
| Carbon black MT parts per weight | 30 | 30 | 30 | 30 | 30 | 30 | 30 |
| MgO—DE parts per weight | 3 | 3 | 3 | 3 | 3 | 3 | 3 |
| Ca(OH)$_2$ parts per weight | 6 | 6 | 6 | 6 | 6 | 6 | 6 |
| Bisphenol AF parts per weight | 2.2 | 2.2 | 2.2 | 2.2 | 2.2 | 2.2 | 2.2 |
| Accelerator parts per weight | 0.45 | 0.45 | 0.45 | 0.45 | 0.45 | 0.45 | 0.45 |
| Tetramethylene sulfoxide parts per weight | — | 0.5 | 1.0 | 1.5 | — | — | — |
| Bis(p. chlorophenyl)sulfone parts per weight | — |  |  |  | 0.5 | 1.0 | 1.5 |
| O.D.R. at 180° C. arc ± 3°, 100 cap |  |  |  |  |  |  |  |
| Minimum torque lbs. inch[1] | 14 | 15 | 15 | 15 | 13 | 14 | 13 |
| Torque at 12 minutes lbs. inch[1] | 143 | 151 | 149 | 152 | 1 7 | 148 | 152 |
| T'$_c$ (50) minutes | 5.3 | 4.8 | 4.2 | 3.6 | 5.0 | 4.6 | 4.2 |
| Cure rate[1] minutes$^{-1}$ | 32 | 34 | 45 | 52 | 34 | 36 | 40 |
| VULCANIZATION: In press at 170° C. for 10 minutes, in oven at 250° C. for 16 hours. | | | | | | | |
| Vulcanized product | | | | | | | |
| Tensile strength (rupture load)[2] M Pa | 16.8 | 16.3 | 15.8 | 15.9 | 16.1 | 15.8 | 15.0 |
| Modulus[2] M Pa | 8.7 | 9.2 | 9.9 | 9.6 | 8.5 | 9.0 | 9.5 |
| Elongation upon rupture[2] % | 170 | 160 | 150 | 145 | 160 | 157 | 150 |
| Shore A hardness[3] — | 75 | 74 | 73 | 71 | 74 | 74 | 73 |
| Compression set on disks, compression for 70 hours 200° C. (ASTM D395 method B): % | 18 | 13 | 16 | 17 | 19 | 17 | 18 |
| Extrudability test[4] Edge | 7 | 8 | 8 | 8 | 8 | 9 | 9 |
| Surface | B | A | A | A | A | A | A |

[1]ASTM D2084
[2]ASTM D412
[3]ASTM D1415
[4]ASTM 2230 (Garvey A. FIG. 5)

TABLE 2

|  | EXAMPLE | | | | | | |
| --- | --- | --- | --- | --- | --- | --- | --- |
|  | 8 | 9 | 10 | 11 | 12 | 13 | 14 |
| Elastomer 2 parts per weight | 100 | 100 | 100 | 100 | 100 | — | — |
| Elastomer 1 parts per weight | — | — | — | — | — | 100 | 100 |
| Carbon black MT parts per weight | 30 | 30 | 30 | 30 | 30 | 30 | 30 |
| MgO parts per weight | 3 | 3 | 3 | 3 | 3 | 3 | 3 |
| Ca(OH)$_2$ parts per weight | 6 | 6 | 6 | 6 | 6 | 6 | 6 |
| Bisphenol AF parts per weight | 1.8 | 1.8 | 1.8 | 1.8 | 1.8 | 2.2 | 2.2 |
| Accelerator parts per weight | 0.6 | 0.6 | 0.6 | 0.6 | 0.6 | 0.45 | 0.45 |
| Tetramethylene sulfoxide parts per weight | — | — | — | 1.0 | 1.5 | — | — |
| Triphenylphosphine oxide parts per weight | — | 1.0 | 1.5 | — | — | 1.0 | 1.5 |
| O.D.R. at 180° C. arc = ±3°, 100 cap | | | | | | | |
| Minimum torque lbs. inch[1] | 26 | 36 | 38 | 28 | 29 | 14 | 16 |
| Torque lbs. inch[1] | 128 | 120 | 112 | 122 | 114 | 148 | 140 |
| T'$_c$ (50) minutes | 4.0 | 2.9 | 2.0 | 2.8 | 2.5 | 4.0 | 4.3 |
| Cure rate[1] minutes$^{-1}$ | 37.0 | 38.5 | 41.0 | 39 | 39 | 42 | 38 |
| VULCANIZATION: In press at 170° C. for 10 minutes, in oven at 250° C. for 16 hours. | | | | | | | |
| Vulcanized product | | | | | | | |
| Tensile strength (rupture load)[2] M Pa | 17 | 16.6 | 16.0 | 16.3 | 16.0 | 16.0 | 16.4 |
| Modulus[2] M Pa | 6.0 | 6.5 | 6.8 | 6.4 | 7.0 | 9.0 | 9.3 |
| Elongation upon rupture[2] % | 200 | 190 | 185 | 183 | 180 | 165 | 158 |
| Shore A hardness[3] | 76 | 74 | 72 | 74 | 73 | 74 | 73 |
| Compression set on disks, compression for 70 hours 200° C. (ASTM D395 method B): % | 33 | 31 | 28 | 29 | 30 | 16 | 17 |
| Extrudability test[4] Edge | 7 | 8 | 8 | 8 | 8 | 8 | 8 |
| Surface | B | A | A | A | A | A | A |

[1]ASTM D2084
[2]ASTM D412
[3]ASTM D1415
[4]ASTM 2230 (Garvey A. FIG. 5)

What is claimed is:

1. A vulcanizable fluoroelastomeric composition consisting essentially of:
   (a) 100 parts by weight of a copolymer having a base of vinylidene fluoride (40 to 84 mol%), perfluoropropene (from 15 to 30 mol%) and tetrafluoroethylene (0 to 30 mol%);
   (b) from 0.3 to 6 parts by weight of one or more compounds of the general formula $R_nX$ in which n equals 2 or 3, X is a bivalent or trivalent group selected from: phosphoric esters

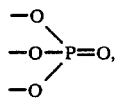

phosphine oxide

sulfoxide SO and sulfone $SO_2$, and R is an alkyl, cycloalkyl or aryl radical having from 1 to 18 carbon atoms, wherein two alkyl radicals may be taken together to form a bivalent alkylene radical;
   (c) from 0.3 to 6 parts by weight of a polyhydroxy compound of the type known as vulcanizing agent for fluoroelastomers;
   (d) from 0.2 to 4 parts by weight of an aminophosphine or phosphoraneamine compound of the type known as accelerating agent in the vulcanization of fluoroelastomers with the polyhydroxy compounds (c);
   (e) from 1 to 20 parts by weight of one or more acid acceptors formed of metal oxides, hydrates or carbonates having a basic character, of the type known in the vulcanization of fluoroelastomers.

2. A vulcanizable fluoroelastomeric composition according to claim 1, characterized by the fact that the compound of general formula $R_nX$ is selected from among dimethylsulfoxide, bis(p-chlorophenyl)sulfone, bis(p-chlorophenyl)sulfoxide, dimethylsulfone, cyclic tetramethylene sulfoxide, triphenylphosphine oxide and trioctyl phosphate.

3. A vulcanizable fluoroelastomeric composition according to claim 1, characterized by the fact that the vulcanization accelerator is selected from among 1-chloro-1,1-diphenyl-1-benzyl-N-diethyl-phorphoraneamine and 1-bromo-1-phenyl-1-benzyl-N,N'-tetramethyl-phosphorane diamine.

4. A vulcanizable fluoroelastomeric composition according to claim 1, characterized in that in the compound (b) of general formula $R_nX$, X is

5. A vulcanizable fluoroelastomeric composition according to claim 1, wherein X is a bivalent group.

6. A vulcanizable fluoroelastomeric composition according to claim 5, wherein X is sulfoxide.

7. A vulcanizable fluoroelastomeric composition according to claim 5, wherein X is sulfone.

8. A vulcanizable fluoroelastomeric composition according to claim 1, wherein X is a trivalent group.

9. A vulcanizable fluoroelastomeric composition according to claim 8, wherein X is a phosphoric ester.

10. A vulcanizable fluoroelastomeric composition according to claim 8, wherein X is a phosphine oxide.

* * * * *